June 4, 1957 G. T. McNEIL 2,794,379
PANORAMA CAMERA
Filed May 29, 1956 2 Sheets-Sheet 1
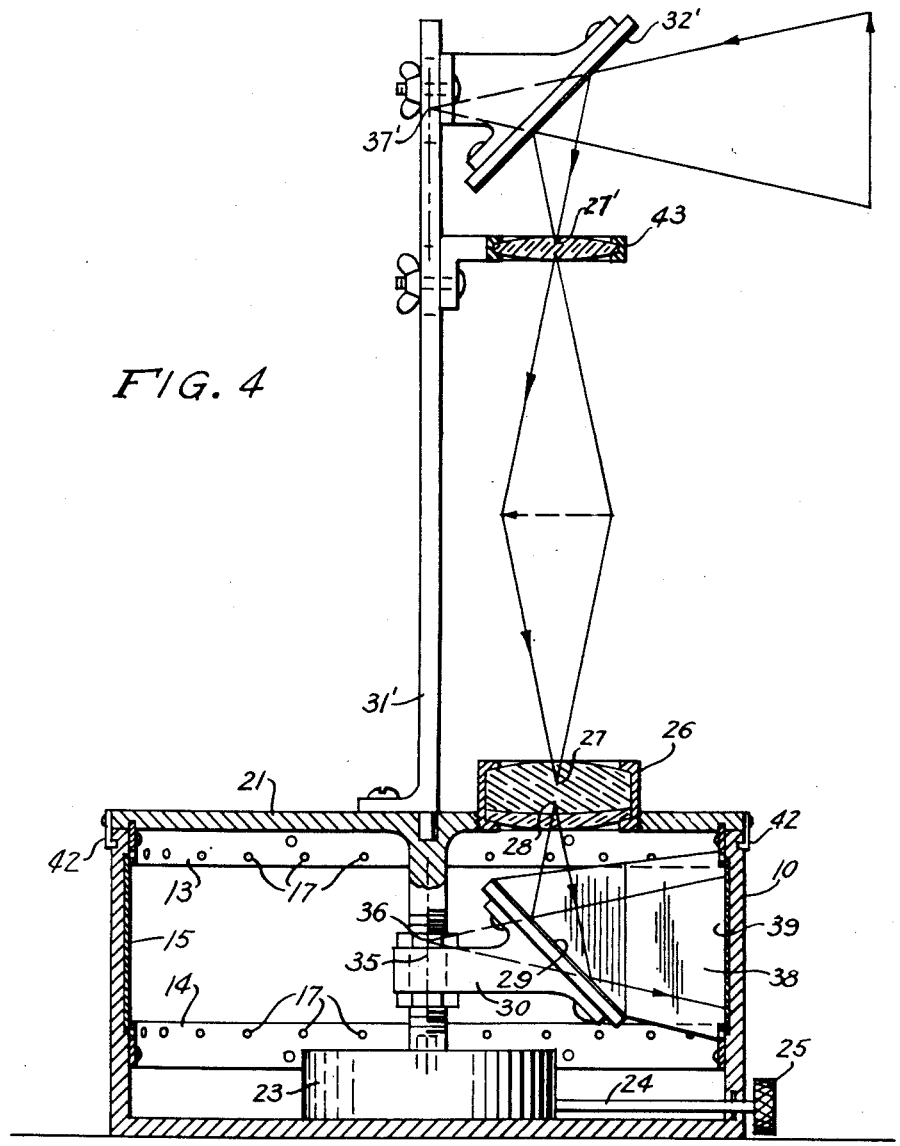
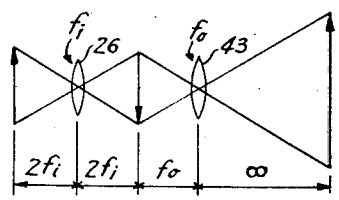
INVENTOR
GOMER T. McNEIL
BY Walter S. Pawl
ATTORNEY June 4, 1957  G. T. McNEIL  2,794,379
PANORAMA CAMERA
Filed May 29, 1956  2 Sheets-Sheet 2
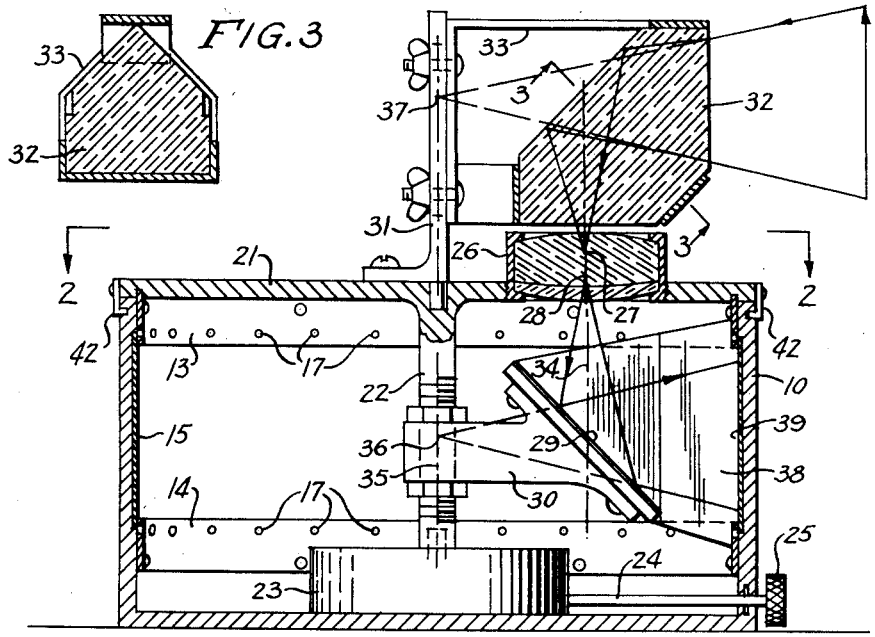
FIG. 3
FIG. 1
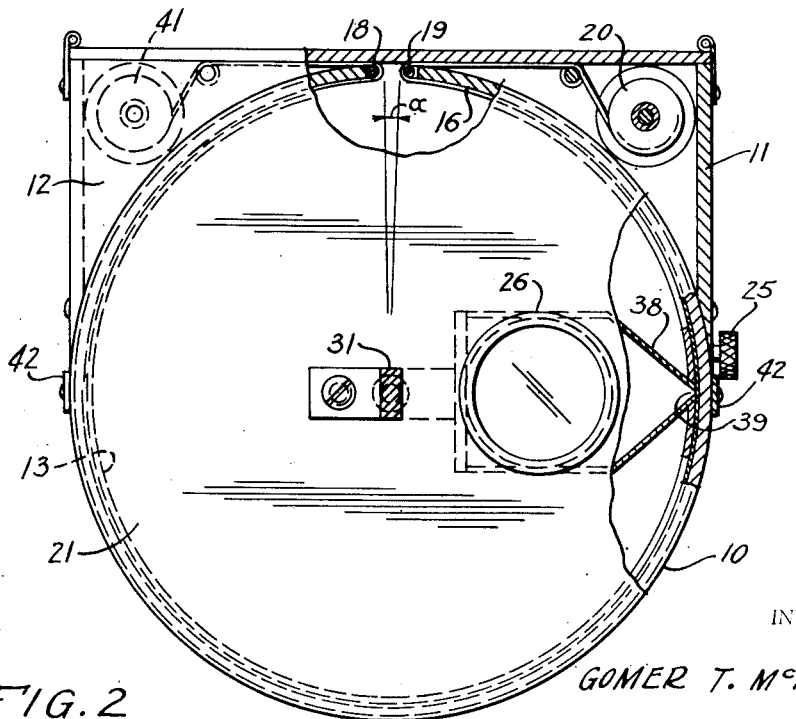
FIG. 2
INVENTOR
GOMER T. McNEIL
BY Walter S. Pawl
ATTORNEY United States Patent Office 2,794,379
Patented June 4, 1957

2,794,379

PANORAMA CAMERA

Gomer T. McNeil, Silver Spring, Md., assignor to Photogrammetry, Inc., Silver Spring, Md., a corporation of Delaware Application May 29, 1956, Serial No. 588,054

13 Claims. (Cl. 95—16)

This invention relates to improvements in panorama cameras for use in accurate undistorted recording of panorama views, such as required in photogrammetric measurements.

The object is to produce accurate photographic reproductions of panorama views on a cylindrical focusing plane.

A further object is to eliminate what is known as image movement or "smearing" the image on the exposure surface of a cylindrically positioned film, by a rotating slit of the projected image, in a panorama camera.

A further object is to mount the lens in a horizontal wall of a camera for transmitting the image ray from the horizon between 45° mirrors mounted above and below said wall, for rotation therewith about a vertical axis, the outer mirror and said lens being independently adjustable parallel to said axis, whereby they may be adjusted so as to bring the effective positions of the front and rear nodal points of the lens, as reflected by the mirrors, directly on said vertical axis, and the plane of focus of the panoramic image will correspond accurately with the cylindrical exposure surface in the camera which is concentric with said axis; one of said 45° mirrors being roof prism, whereby the image on the cylindrical exposure surface will be held stationary during rotation of the mirror and lens assembly.

A further object is to use plain mirrors in conjunction with a two lens system, instead of the roof prism for one of the mirrors and a single lens as in the above combination, whereby the object rays would maintain the same directions as the corresponding image rays during the rotation of the mirror lens assembly about the vertical axis of rotation; and the image, even though reversed in the vertical plane, would remain stationary on the exposure surface during the rotation; the front and rear nodal points of the lens system in this case having their effective positions directly on the axis of rotation, to prevent image movement or "smearing."

Other and more specific objects will appear in the following detailed description of two forms of camera made in accordance with the present invention, as illustrated in the accompanying drawing, wherein:

Fig. 1 is an elevational section of one form of the camera taken in the plane of the principal axis of the image projection means.

Fig. 2 is a sectional plan view of the camera taken on the lines 2—2 of Fig. 1, and broken away in parts to show details of construction and arrangement of parts.

Fig. 3 is a detail sectional view of the roof prism mirror taken on the line 3—3 in Fig. 1, Fig. 4 is an axial sectional view in elevation of another form of mirror and lens arrangement in a camera according to the present invention, and Fig. 5 is a diagrammatic view of the lenses selected for this arrangement to provide equal cone angles for the object and image in order to prevent image movement when the mirror and lens assembly is rotated during an exposure.

The cameras here illustrated show only the essential elements without any attempt at refinement of details.

The camera housing includes a cylindrical light-sealed chamber or casing 10 and adjacent film supply and take-up magazine chambers 11 and 12 respectively.

A pair of cylindrical flange strips 13 and 14 provide guide means for guiding the film 15 around the cylindrical film guide surface 16. One or both of the flange strips may be perforated as at 17 at regular angular intervals, for recording directional relations of correspondingly laterally spaced points on the exposure.

A pair of guide rollers 18 and 19 are closely spaced at the periphery of the cylindrical film guide surface 16 for guiding the film from the supply reel 20 to the film guide surface and from the film guide surface to the take-up reel 41 respectively. Thus a substantially 360° panoramic view may be recorded, leaving only a negligible blind angle $\alpha$, which may ordinarily be pointed in a relatively unimportant direction in the object scene to be recorded. Well known film feeding controls may be provided for advancing the film the proper amount for each exposure.

The upper end wall 21 of the cylindrical chamber 10 is rotatably mounted by means of its axially extending post 22 which is keyed to and supported by the shaft of the timing motor 23. Motor 23 has a control shaft 24 which extends to the outside of casing 10 where it is provided with a knob 25.

The end wall 21 has an offset aperture threaded to receive a lens assembly 26 having nodal points 27 and 28 in the form shown in Fig. 1. A 45° mirror 29 is mounted below the lens by means of a bracket support 30 keyed to the post 22 for axial adjustment thereon. A bracket 31 mounted on top of end wall 21 supports a roof prism 32, serving as a 45° mirror above the lens, by means of bracket support 33 which is vertically adjustable on bracket 31.

Bracket support 30 is made axially adjustable on post 22 for proper alignment of the mirror 29 with the film strip 15, upon assembly.

The joint between the periphery of the end wall 21 and the upper edge of cylindrical casing 10 is of the tortuous passage type to provide a good light trap without causing any binding between the parts in operation. This is obtained in the present construction by extending the upper edge of flange strip 13 above the top of the cylinder wall of chamber 10 to mesh with a corresponding circular groove in the end wall 21. Tongues 42 are fixed to the peripheral edge of the end wall 21 and have flange portions at their lower ends slidingly engaging the external groove in the cylinder wall of casing 10.

The camera is assembled by selecting the proper lens assembly and adjusting it in the offset aperture, so as to space the rear nodal point 28 of lens 26, precisely from mirror 29 a distance along the optical axis equal to the displacement of the lens axis 34 from the axis of rotation 35 of the end wall. The upper mirror 32 is then adjusted so as to bring the effective position of the front nodal point 27 exactly on the axis 35. This adjustment will bring the effective nodal points, as reflected by the respective mirrors, directly on the axis of rotation 35, at 36 and 37 respectively, thus providing for transmission of a continuous undistorted, discrete panoramic image of the objects at the object radial distance of the lens to the cylindrical focal plane surface on which the film is guided, as the end wall, with the lens and mirrors, is rotated.

A hood 38 extends radially from bracket 30 around the sides and bottom of the mirror 29 to a vertically slitted shutter 39 closely spaced from the cylindrical wall and film, so that short exposure timing may be obtained with a comparatively low rotating speed.

Motor 23 may be any known type, either spring operated or electric, and may have speed control and cyclic operation of one revolution to obtain a complete 360° exposure at one time.

This camera is adapted to provide precise panoramic reproductions, especially at finite and short radial distances, such as required in photogrammetric work. For example, in the examination of the condition of the tubular walls of well shafts, bore holes, tunnels, gas pipes, etc., it may be important to obtain discrete panoramic images, and exact radial directions of defects, etc. The camera might also be used for periodically recording the readings of a multiplicity of panoramically arranged instruments, which would be impossible to read simultaneously by one individual, as for example, by a test pilot during test manuevers. Many other uses will become apparent to those interested in obtaining photogrammetrically discrete panoramic images of objects, especially at definite object distances, and substantially instantaneously.

It is to be noted that the panoramas involved are not restricted to the horizontal plane, and obviously the camera can reproduce panoramic images in any plane desired.

The bracket 30 for the mirror 29 is made adjustable on post 22 in the actual construction of the camera, so that mirror 29 can be adjusted axially to overcome any misalignment of parts due to manufacture, or even to adapt the camera for different size of film, etc. However, it could be fixed rigidly to the post where such adjustment is not required.

It should be noted that the image distance in the present camera is determined by the radius of the cylindrical film guide surface 16, and for infinite object distance the lens selected would have to have a focal distance equal to this radius. However, for a finite or short object distance, a specific lens has to be selected having the same image distance for the required finite or short object distance desired.

It should be further noted that if two plain mirrors were used in the form illustrated in Fig. 1, the image on the exposure surface would move in the opposite direction as the mirror and lens assembly was turned on its vertical axis, because the image is laterally reversed with respect to the object. The resulting "smearing" of the exposure image could be reduced by reducing the width of the shutter slit to a minimum consistent with other considerations of exposure requirements, but obviously the theoretical limit of zero width of slit for no "smearing" could not be very closely approached. The use of a roof prism for one of the 45° mirrors eliminates this smearing entirely because it reverses the image laterally back to normal in accordance with the object view, and thus stops the motion of the image on the exposure surface.

It should be further noted that, in order to maintain the effective nodal points on the axis 35 in changing from one lens to another for any change in the desired object distance, it is only necessary to adjust the lens to bring its rear nodal point the proper distance along the optical axis from the lower mirror 29 and then adjust the upper mirror the same distance above the front nodal point of the lens, the camera to be held in the center of the cylindrical object panorama during an exposure. Any suitable distance between the axes 35 and 34 may be used in the design of the camera, and this does not have to be half the radius of the cylindrical film guide, although such spacing of the axes would seem to be most suitable and would place the lower mirror conveniently at the middle of the image distance. However, it might be desirable to move the lens axis closer to or farther from the axis of rotation to solve some structural problems of design. For example, if the size of mirrors had to be kept at a minimum, closer spacing of the axes would permit the use of smaller mirrors to cover a particular cone angle of the lens. On the other hand, for large cone angle lenses and where size of mirror is no object, it may be more practical to spread the axes further apart.

For any particular image distance, the radius of the cylindrical exposure surface would be designed equal to such distance, and the lens axis would be designed at any suitable intermediate position along the radius of this cylinder, such spacing of the axes determining also the spacing between the mirrors and their respective nodal points so as to cause the effective nodal points, as viewed in the mirrors, to fall directly on the axis of rotation.

Another modification of the mirror and lens combination which may be used to stop the motion of the image on the exposure surface, as shown in Fig. 4, is to use a two lens system with plain 45° mirrors 29 and 32', where the effective positions of the front and rear nodal points 37' and 36 of the system are adjusted to be on the axis of rotation 35. Thus, even though the image on the exposure surface is reversed vertically with respect to the object, it will not move laterally as the mirror and lens assembly is turned during operation of the camera. By a proper selection of lenses in this system distortion of the image may be eliminated, if the focal length $f_i$ of the image lens 26 is substantially one half the focal length $f_o$ of the object lens 43, the cone angle for any area in the object view will correspond to the cone angle for the corresponding area in the image view. Thus the image can be completely stopped during the operation of the camera, and perfect exposures are obtainable.

In the diagram shown in Fig. 5, the object field at infinity may represent a depth of focus including everything from infinity down to a distance of 10 feet, with a selected lens and a sufficiently reduced aperture. However, for finite distances, when very discrete images are desired, a different lens 43 may be selected for each particular object distance desired, the lenses all having the same image distance ($f_o=2f_i$) for their different respective object distances, whereby the images on the cylindrical exposure surface will always subtend the same cone angles that are subtended by the corresponding objects at the object lens. Thus the images will be absolutely stationary during operation of the camera, producing sharp, unsmeared and undistorted exposures.

This application is a continuation-in-part of my prior application S. No. 581,624, filed April 30, 1956, for Panorama Camera.

Many obvious modifications in the form and detail arrangement of parts may be made without departing from the spirit and scope of the present invention, as defined in the appended claims.

What is claimed is:

1. A panorama camera having a vertical cylindrical wall with means for guiding a film strip with an exposure surface thereon, a rotatable axially slit shutter, a cylinder end wall of said camera being rotatably mounted on said cylinder axis to rotate with said shutter, a lens mounted in said cylinder and wall off said axis, and 45° mirrors fixed to said wall on opposite sides of said lens for directing a pencil of rays from the horizon through said lens and radially to said exposure surface, said mirrors being equally spaced from adjacent nodal points of said lens system and from said axis, both reflecting surfaces being turned away from said axis, whereby said effective nodal points as reflected in the mirrors will fall on the axis of rotation and discrete images may be projected on said exposure surface, without image movement during rotation of the shutter.

2. A panorama camera as defined in claim 1, fixed cylindrical guide flanges for guiding a film strip around said cylindrical wall extending over the edges of the film strip, said flanges having spaced perforations at regular angular intervals providing accurate relative directional references on said film strip.

3. A panorama camera as defined in claim 1, said end wall having an axial shaft extending downwardly and journalled in the bottom of said camera, and motor means connected to said shaft for rotating said end wall at controlled speeds for timing the exposure.

4. A panorama camera as defined in claim 3, said end wall having peripherically spaced clips with in-turned flanges closely fitting in an external groove in the adjacent end of said cylindrical wall to form a light-tight rotatable joint between the two walls.

5. A panorama camera comprising a vertical cylindrical casing, a vertically mounted lens system, eccentrically positioned in an end wall of said cylindrical casing, said end wall being rotatable on a vertical axis, guide means for guiding a film strip around the inside of the cylindrical wall of said casing, means providing a light-seal in the joint between said end wall casing, 45° mirrors fixed to said end wall, above and below said lens system, said mirrors being in planes normal to each other and normal to the plane of said vertical axis and the lens system axis, the spacing of each mirror from the adjacent nodal point of the lens system being equal to the separation of said axes, whereby discrete panoramic images of objects on a common radius from the camera may be obtained on said film strip during rotation of said end wall.

6. A camera as defined in claim 5, and a vertically slit shutter fixed to said end wall for rotation therewith to expose said film.

7. A camera as defined in claim 6, motor means for rotating said end wall one turn at a time, and means for controlling its speed to time the exposure of the film in said guide means.

8. A camera as defined in claim 5, said lens system comprising a single lens assembly, one of said 45° mirrors being a roof prism.

9. A camera as defined in claim 8, said one of said 45° mirrors being the outer one, whereby the effect on the image position due to the thickness of said prism will be negligible since it is in the object space.

10. A camera as defined in claim 9, said mirrors and lens assembly each having limited axial adjustment.

11. A camera as defined in claim 9, said lens assembly and outer roof prism having limited axial adjustment.

12. A camera as defined in claim 5, said lens system comprising two lenses, relatively adjustable for focusing.

13. A camera as defined in claim 12, said outer or object lens being fixed to said outer mirror at a distance, spacing the mirror from its object nodal point the same as the spacing between the lens axis and the axis of rotation, whereby adjustment of the object lens for focusing will not move the effective nodal point off the axis of rotation.

No references cited.